April 7, 1970  B. J. COBB ET AL  3,504,535
STRESS CORROSION MEASUREMENT APPARATUS
Filed Feb. 26, 1968
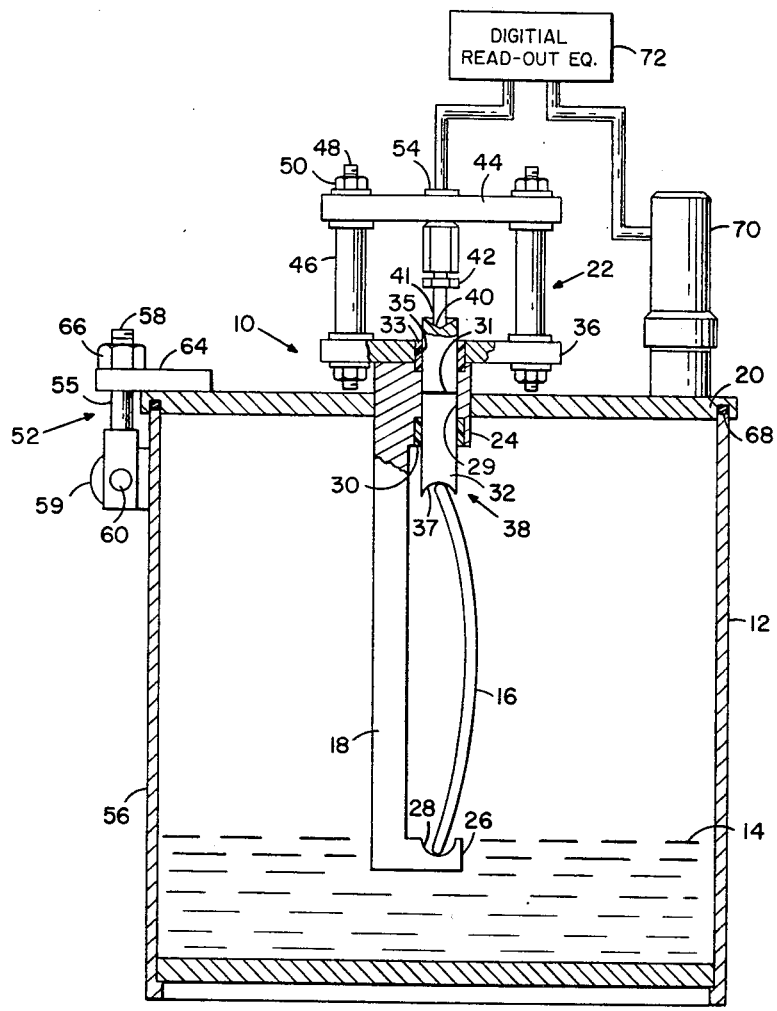
Bernie J. Cobb
John H. Honeycutt,
INVENTORS,
BY Harry M. Saragovitz
Edward J. Kelly
Herbert Berl
Harold W. Hilton United States Patent Office 3,504,535
Patented Apr. 7, 1970

3,504,535
STRESS CORROSION MEASUREMENT APPARATUS
Bernie J. Cobb, Huntsville, and John H. Honeycutt, Madison, Ala., assignors to the United States of America as represented by the Secretary of the Army
Filed Feb. 26, 1968, Ser. No. 708,051
Int. Cl. G01n 17/00
U.S. Cl. 73—86                               1 Claim

ABSTRACT OF THE DISCLOSURE

Apparatus for simulating and monitoring the stress corrosion condition of stored members. The member is submerged in a fluid (acid or alkaline) carried in a tank and is stressed through a loadbeam to a desired level and the tank is sealed to the atmosphere. The loadbeam forms a load cell whose deflection can be measured. A pressure transducer is carried in the closed tank to record pressure changes therein responsive to changes in the characteristics of the fluid. Signals from the pressure transducer and the load cell are fed into a digital read-out and recorder at set intervals to indicate changes in the specimen over a period of time.

DEDICATORY CLAUSE

The invention described herein may be manufactured, used and licensed by or for the Government for governmental purposes without the payment to us of any royalty thereon.

BACKGROUND OF THE INVENTION

"Stress corrosion" is a mode of failure experienced by some materials. In order for stress corrosion to occur, there must be stress present in the material when subjected to a corrosive environment. Stress corrosion is characterized by a brittle failure of the material and generally occurs in the absence of visual overall attack. In most cases, the occurrence of stress corrosion failure is catastrophic since there is no forewarning of its occurrence. A classical example of stress corrosion is "season cracking" of brass. At one time, it was common to find brass cartridge cases cracking in the spring and autumn. The cases had the residual stresses due to fabrication and the high moisture content of the air at these times provided the environment.

The basic test for stress corrosion is one in which a sample of material is stressed to a known level then subjected to a specific environment. This is generally done in a manner in which failure can be detected by visual means. There are no known methods of testing materials in a closed environment where the stress and failure can be monitored remotely. However, there is a need for testing materials in such an environment, especially where acids are involved.

SUMMARY OF THE INVENTION

The device of the present invention includes apparatus for subjecting a specimen to stress corrosion while continuously monitoring the specimen. A loading device is utilized to stress the specimen to a desired level while the specimen is submerged in a fluid carried in an enclosed tank. A monitor is secured to the load device to record the changes in load on the specimen, which may be directly related to corrosion rate, in the case of uniform corrosion, through relaxation of the load on the speciment. A pressure transducer is carried in the tank to resord pressure changes occurring therein.

It is an object of the present invention, therefore, to provide mechanism for continuously monitoring a specimen for a substantially long period of time and for indicating the general corrosion condition thereof throughout said time period.

It is another object of the present invention to provide such mechanism with means for providing a precise record of when the stress corrosion failure occurs.

It is still another object of the present invention to provide mechanism with an environment for simulating stress corrosion conditions in a specimen and for monitoring the specimen and indicating when the stress corrosion occurs.

These and other objects and advantages of the present invention will be more readily apparent from the following detailed description and accompanying drawing.

BRIEF DESCRIPTION OF THE DRAWING

The figure is an elevational sectional view of the device of the present invention showing a specimen carried in a tank under stressed conditions.

As shown in the figure the stress corrosion test fixture 10 is shown to include a tank 12 enclosing a substance such as a fluid 14 into which a specimen 16 is submerged. For clarity, the tank is shown to be only partially full.

To support the specimen in the fluid in a prestressed condition, a specimen holder 18 is secured to tank top 20 and extends therethrough for cooperation with and support of, a loading mechanism 22. Holder 18 includes an upper flanged portion 24 and a lower flanged portion 26 having an identation 28 therein. The upper flanged portion 24 is provided with an opening 29 having a Teflon bushing 30 mounted therein.

Loading mechanism 22 includes a piston 32 extended through bushing 30 and is further supported in a bushing 33 which is mounted in opening 29 and in an opening 35 of a support member 36. Piston 32 extends through opening 29 of flanged portion 24 and is sealed therein by an O-ring 31. Piston 32 extends through flanged portion 24 and is provided with an indented surface 37 at the bottom end 32 thereof, and an indentation 40 at the upper end thereof for support of one end 41 of a load screw 42 therein. Load screw 42 extends upward from indentation 40 for engagement with a loadbeam 44. Loadbeam 44 is supported on support member 36 by posts 46 and in secured relation by bolts 48 and nuts 50.

As seen in the FIGURE 1, the tank 12 includes a plurality of clamps 52 for engaging the tank top 20 to secure the top to sides 56 of the tank. The clamps 52 include a plurality of arms 55 having external threading 58 thereon and a plurality of pads 59 carried around the periphery of the tank for pivotal support, at pivot pin 60, of arms 55. A plurality of latching members 64 are secured around the top 20 of tank 12 and provided with openings or slats (not shown) to receive arms 55 therein. The arms are locked in latch members 64 by nuts 66 to secure the top on the tank. The top is sealed tightly to the sides of the tank by an O-ring 68.

A pressure transducer 70 is inserted through the top and into communication with the interior of the tank to indicate pressure changes therein. A digital readout device 72 is connected to the pressure transducer and to a four-arm strain gage bridge 54 on loadbeam 44 to indicate specimen load changes. Such strain gage and loading mechanism may be any of many conventional types known in the art.

In operation, loadbeam 44 is first calibrated by installing an instrumented specimen 16 into the load mechanism and making a correlation between the actual stress in the specimen and the indicated load. The device is then set up as indicated in the figure. Specimen 16 is supported between indentations 28 of specimen holder 18 and indentation 37 of piston 32 in a prestressed condition, due to the loading of piston 32 by loadbeam 44, by adjustment of load screw 42, which essentially forms a load cell whose deflection is measured by strain gage bridge 54. As the load screw 42 is extended, it exerts a force on specimen 16 through piston 32 which is resisted by beam 44. Consequently, there is a direct relationship between the load in specimen 16 and the load in beam 44. Since this relationship has already been established through calibration, it is possible to record changes in the specimen 16 directly, is response to stress relaxation of the specimen. Because of the nature of the fluid used, there will be a pressure build-up inside the container. To monitor the internal pressure, a pressure transducer 70 is used. The signals from the pressure transducer and load cell are fed into digital read-out device and recorder 72 at set intervals.

Because the acid in the tank changes its characteristics during corrosion testing in the sealed environment, pressure changes occur and these pressure changes are monitored by the pressure transducer, whereby, during the reduction of data, the effects of internal pressure on the piston are compensated for. plot of stress versus time is drawn for the life of the specimen and the exact life cycle up to stress corrosion failure can be described.

We claim:

1. Apparatus for simulating and monitoring the stress corrosion condition of stored members comprising:
   (a) a sealed tank enclosing an acid;
   (b) a support mechanism including a specimen holder extending into said tank and provided with a seating surface for support of said specimen thereon;
   (c) load means for application of a force to said specimen for prestressing thereof to a predetermined level, said load means including a piston extending into said tank for engagement with said specimen, a load screw disposed in engagement with said piston, and a loadbeam disposed for deflection and displacement of said load screw for movement of said piston against said specimen for the prestressing thereof;
   (d) a pressure transducer extending into said tank and disposed for indicating pressure changes occurring in said tank throughout storage of said specimen and, load sensing means connected to said piston and said loadbeam for sensing load changes on said piston responsive to said stress relaxation of said specimen;
   (e) readout means connected to the load sensing means for indicating changes in application of said piston forces on said specimen responsive to stress relaxation thereof, said readout means also being connected to said pressure transducer for indicating pressure changes on the portion of said piston which is inserted into said tank, whereby said pressure changes may be compensated for during reduction of the readout data.

References Cited
UNITED STATES PATENTS

| | | | |
|---|---|---|---|
| 2,976,123 | 3/1961 | Marsh et al. | 73—86 |
| 3,060,728 | 10/1962 | Wolber | 73—86 |
| 3,102,419 | 9/1963 | Schaschl | 73—86 |
| 3,161,042 | 12/1964 | Gerhardt | 73—86 |
| 3,198,715 | 8/1965 | Fowler et al. | 204—1 |
| 3,427,873 | 2/1969 | Mehdizadeh | 73—86 |

RICHARD C. QUEISSER, Primary Examiner

HERBERT GOLDSTEIN, Assistant Examiner